Nov. 5, 1940.  P. MAZUR ET AL  2,220,167
SAFETY DEVICE FOR AUTOMOBILE DOORS
Filed Feb. 28, 1939
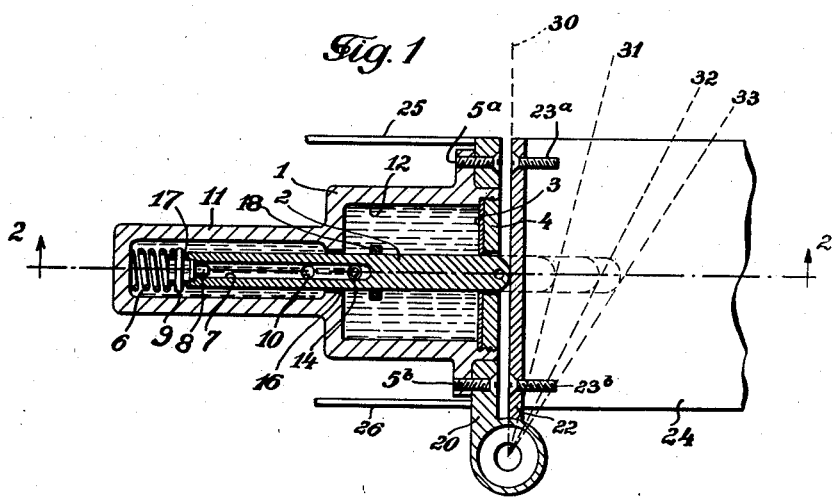
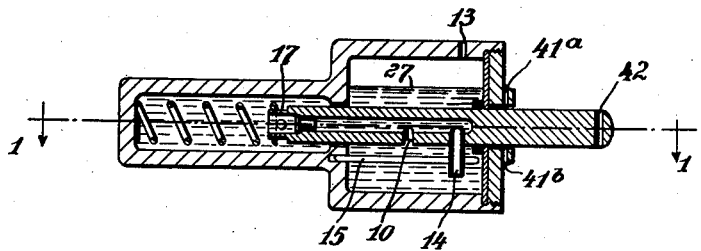
INVENTORS:
William Stephen Tandler
Paul Mazur
BY
ATTORNEY Patented Nov. 5, 1940

2,220,167

UNITED STATES PATENT OFFICE 2,220,167

SAFETY DEVICE FOR AUTOMOBILE DOORS

Paul Mazur and William Stephen Tandler, New York, N. Y.

Application February 28, 1939, Serial No. 258,890

5 Claims. (Cl. 16—54)

The invention relates to pressure-fluid operated safety devices particularly for automobile doors and particularly to a device of this type which prevents injury resulting from the slamming of the car doors.

It is the object of the invention to provide a safety device by which the rapid closing or slamming of the automobile doors is surely interrupted for a short while before the final locking occurs. The complete closing time, however, is for all practical purposes, sufficiently short and the closing and locking itself is as dependable and as secure as ever.

It is a further object of the invention to provide a safety device for automobile doors which works in three distinct successive stages, namely: a first rapid and free moving stage; a second impact-like checking stage, which serves as protection against injury and a third release stage during which the door can be shut with ease.

It is a further object of the invention to provide a regulating device which permits adjustment of the checking stage to adapt its duration to individual requirements. The invention particularly provides for the easy closing of the door in the final stage and assures proper latching.

It is also an object of the invention to provide a safety device for automobile doors which insures a reliable function of the checking means and in which the natural play of the pressure-fluid operated parts is utilized to release the checking resistance.

The invention further fulfills the purpose to be easily mounted within a car body, concealed from view and protected from being damaged.

The invention also provides a safety device for automobile doors in which pressure fluids such as a mixture of alcohol and glycerine may be used, the viscosity of which varies little with changes in temperature, thereby eliminating the necessity of adjustment.

The invention also provides a safety device for automobile doors which is simple in construction, resistant to wear, inexpensive, foolproof, cannot be rendered ineffective unintentionally and does not necessitate structural changes of the car body or the door.

Further objects and advantages of the invention will appear from the detailed description taken in conjuncion with the accompanying drawing which illustrates a preferred embodiment of the same and in which Fig. 1 is a horizontal cross-sectional view along direction of line 1—1 of Fig. 2, and Fig. 2 is a vertical cross-sectional view along direction of line 2—2 of Fig. 1.

Referring to the drawing the present safety device consists of a housing 1 which consists of two chambers of which one is a high pressure chamber 11 and the other is a low pressure chamber 12; these chambers are separated from each other preferably by a partition 16. In this housing a plunger 2 is longitudinally slidable. The housing is closed by cover 3 and fitting 4. It is screwed to hinge 20 by screws 5a and 5b. The plunger has a longitudinal bore 7 at the one end of which is provided a plug-like floating valve 8. The longitudinal bore opens out at one end to valve 8 and has two apertures namely the release hole 10 and the suction hole 14; a small tubing is connected to hole 14. A pressure spring 6 is mounted between the plunger 2 and the inner wall of the chamber 11 and it surrounds the reduced end part 17 of the plunger; the spring is held in position by a little pin 9, which at the same time prevents the dropping-out of the valve. The spring 6 tends to push plunger 2 into its extreme outer position. Two guide rods 15 insure the proper position of the plunger by guiding the suction tube 14. An airvent 13 is provided in the outer chamber 12. A ring 18 is mounted on the plunger 2. The width of ring 18, respectively its position, controls the distance by which the plunger will protrude from the housing. Figure 1 essentially shows the position when the car door is closed. Parts 20 and 22 represent the two halves of a hinge with a shaft 21 between them. 25 and 26 denominate the inner and the outer wall respectively of the body of the car, leaving in-between sufficient space for the mounting of the device, 23a and 23b are screws by which the hinge is screwed to car door 24.

In Fig. 1 the various positions of the car door are shown by dotted lines which represent the operating stages of the door closing procedure.

Line 33 represents the position of the door at the end of the first free-moving or slamming stage when the door hits the plunger 2 in case no controlling member 18 is provided. If however such controlling ring is used as in the present embodiment of the invention this position would be represented by line 32; the second checking stage is shortened in conformity with the angular spacing of 31 to 32. By the application of further or differently positioned members 18 the checking stage can be further regulated. The end of the checking stage is represented by line 31 and the end of the final closing stage by line 30 showing the door in the closed position.

The operation of the device is described, as follows:

It is assumed that the door is somewhere beyond 33 in its open position. The inner chamber 11 is completely filled with pressure fluid for example oil as is the bore 7 inside of the plunger. The outer chamber will be filled up to a level shown in the drawing by line 27 of Figure 2.

As soon as the door is moved toward closed position its hinge hits the rounded-off end of plunger 2; valve 8 will be knocked into a closing position by the shock and the pressure of the fluid in chamber 11. The closing movement is suddenly checked. Upon the continued pressure exerted on the door oil passes during an accurately determinable time through the small openings surrounding valve 8 and on account of the natural play of the pressure fluid operated parts into the outer chamber 12; the pressure in the inner chamber will be released while plunger 2 moves further inwards. As soon however as release hole 10 passes the opening of the wall 16 oil flows freely from the inner chamber 11 to the outer chamber 12; the pressure will now be entirely released and the car door can be moved into perfect closure which will take place when the plunger arrives in a position as shown by dotted line 30 of Fig. 1. The plunger stays in this position all the time that the door is kept closed.

When the door is opened spring 6 expands and presses plunger 2 outwards. Oil will pass through suction tube 14 from the outer chamber 12 through bore 7; valve 8 is opened by the flow of the fluid and inner chamber 11 fills up. When the door is opened to a position beyond 33 the plunger 2 will be all-the-way out and in its renewed operating position.

In case of repairs where the door may have to be opened and closed continuously or for any other reason, it will be useful to put the device temporarily out of operation; for this purpose holes 41a and 41b in small lugs fastened to cover 3 are provided which are moved into alignment with bore 42 of plunger 2; a pin may then be inserted into these holes to keep the plunger in its inner position.

What we claim is:

1. A door check particularly for automobile doors comprising a door hinge, a housing connected therewith, adjacent chambers in said housing located in axially alined relationship, a separating wall between said chambers of which one is a high-pressure chamber, a plunger rod axially displaceable through said wall and adapted to be shifted in a free moving, a short checking and a final closing stage and protruding with its outer end from said housing, an axial bore in said plunger extending from its open end through a part of the same, means to temporarily close said open end and a lateral release bore in the plunger securing a free connection of said two chambers during the final closing stage, the pressure release during the checking stage being produced by the natural gap between said closing means and the plunger rod and between said plunger rod and said separating wall.

2. A door check particularly for automobile doors comprising a door hinge, a housing connected therewith, adjacent chambers located in axially alined relationship within said housing, a separating wall between said chambers of which one is a high-pressure chamber, a comparatively thick plunger-rod axially displaceable through said wall adapted to be shifted in a free moving, a short checking and a final closing stage and protruding with its outer end from said housing, an axial bore in said plunger extending from its open end through a part of the same, a floating valve seated upon the open end of said plunger and a lateral release bore in the same securing a free connection of said two chambers during the checking stage being produced by the natural gap between the floating valve and its seat and between the plunger-rod and the separating wall.

3. A door check particularly for automobile doors comprising a door hinge, a housing connected therewith, adjacent chambers located in said housing in axially alined relationship, a separating wall between said chambers of which one is a high-pressure chamber, an axially displaceable plunger-rod extending through said wall adapted to be shifted in a free moving, a short checking and a final closing stage and protruding with its outer end from said housing, an axial bore in said plunger extending from its open end through a part of the same, a floating valve seated upon the open end of said plunger and a lateral release bore in the same securing a free connection of said two chambers during the final closing stage, a second lateral bore in said plunger connecting said chambers during the free moving stage, the pressure release during the checking stage being produced by the natural gap between the floating valve and its seat and between the plunger-rod and the separating wall.

4. In a door check according to claim 3 a tube section connected to said second bore and guiding means for the plunger on both sides of said tube section.

5. A door check particularly for automobile doors comprising a door hinge, a housing connected therewith, adjacent chambers located in axially alined relationship in said housing, a separating wall between said chambers of which one is a high-pressure chamber, a plunger-rod axially displaceable through said wall adapted to be shifted in a free moving, a short checking and a final closing stage and protruding with its outer end from said housing, an axial bore in said plunger extending from its open end through a part of the same, a means to temporarily close said open end and a lateral release bore in the plunger securing a free connection of said two chambers during the final closing stage, the pressure release during the checking stage being produced by the natural gap between said closing means and its seat and the separating wall and the plunger-rod and a compression spring between the inner end wall of the high pressure chamber and the open end of said plunger-rod.

PAUL MAZUR.
WILLIAM STEPHEN TANDLER.